United States Patent
Bowden et al.

(10) Patent No.: US 10,399,664 B2
(45) Date of Patent: Sep. 3, 2019

(54) IMMERSED CORE FLOW INLET BETWEEN ROTOR BLADE AND STATOR VANE FOR AN UNDUCTED FAN GAS TURBINE

(71) Applicant: GENERAL ELECTRIC COMPANY, Schenectady, NY (US)

(72) Inventors: William Joseph Bowden, Fairfield, OH (US); Andrew Breeze-Stringfellow, Cincinnati, OH (US); Richard David Cedar, Cincinnati, OH (US); Syed Arif Khalid, West Chester, OH (US); Patrick John Lonneman, Erlanger, KY (US); Aleksander Piotr Pasieczny, Warsaw (PL); Daniel Lawrence Tweedt, West Chester, OH (US)

(73) Assignee: General Electric Company, Schenectady, NY (US)

( * ) Notice: Subject to any disclaimer, the term of this patent is extended or adjusted under 35 U.S.C. 154(b) by 507 days.

(21) Appl. No.: 15/145,894

(22) Filed: May 4, 2016

(65) Prior Publication Data

US 2016/0333734 A1 Nov. 17, 2016

(30) Foreign Application Priority Data

May 11, 2015 (PL) .......................................... 412269

(51) Int. Cl.
*B64C 11/14* (2006.01)
*B64D 33/02* (2006.01)
(Continued)

(52) U.S. Cl.
CPC .............. *B64C 11/14* (2013.01); *B64D 33/02* (2013.01); *F01D 5/02* (2013.01); *F01D 9/041* (2013.01);
(Continued)

(58) Field of Classification Search
CPC ................................................ B64C 2201/165
See application file for complete search history.

(56) References Cited

U.S. PATENT DOCUMENTS

| | | |
|---|---|---|
| 2,934,150 A | 4/1960 | Fink |
| 4,641,678 A | 2/1987 | Haas et al. |
| | (Continued) | |

FOREIGN PATENT DOCUMENTS

| | | | | |
|---|---|---|---|---|
| CA | 2902826 A1 | * | 5/2014 | ............... F02K 1/46 |
| CN | 102733863 A | | 10/2012 | |
| | (Continued) | | | |

OTHER PUBLICATIONS

Japanese Search Report issued in connection with corresponding JP Application No. 2016-093539 dated Apr. 14, 2017.
(Continued)

*Primary Examiner* — Justin D Seabe
*Assistant Examiner* — Juan G Flores
(74) *Attorney, Agent, or Firm* — Dority & Manning, P.A.

(57) ABSTRACT

An unducted thrust producing system is provided that can include a rotating element having an axis of rotation about a central longitudinal axis and comprising a plurality of blades attached to a spinner; a stationary element positioned aft of the rotating element; and an inlet positioned between the rotating element and the stationary element such that the inlet passes radially inward of the stationary element. The rotating element defines an annular valley positioned between a first annular crown and a second annular crown, and the inlet defines an open area positioned aft of the second annular crown.

19 Claims, 3 Drawing Sheets

(51) Int. Cl.
<table>
<tr><td>F02C 6/20</td><td>(2006.01)</td></tr>
<tr><td>F02C 7/05</td><td>(2006.01)</td></tr>
<tr><td>F01D 5/02</td><td>(2006.01)</td></tr>
<tr><td>F01D 9/04</td><td>(2006.01)</td></tr>
<tr><td>F01D 25/04</td><td>(2006.01)</td></tr>
<tr><td>F01D 25/24</td><td>(2006.01)</td></tr>
<tr><td>F04D 29/32</td><td>(2006.01)</td></tr>
<tr><td>F04D 29/38</td><td>(2006.01)</td></tr>
<tr><td>B64D 27/00</td><td>(2006.01)</td></tr>
</table>

(52) U.S. Cl.
CPC ............ *F01D 25/04* (2013.01); *F01D 25/24* (2013.01); *F02C 6/206* (2013.01); *F02C 7/05* (2013.01); *F04D 29/329* (2013.01); *F04D 29/38* (2013.01); *B64C 2201/165* (2013.01); *B64D 2027/005* (2013.01); *F05D 2220/325* (2013.01); *F05D 2220/36* (2013.01); *F05D 2240/80* (2013.01); *F05D 2250/184* (2013.01); *F05D 2260/607* (2013.01); *F05D 2260/96* (2013.01); *Y02T 50/66* (2013.01); *Y02T 50/671* (2013.01); *Y02T 50/675* (2013.01)

(56) References Cited

U.S. PATENT DOCUMENTS

<table>
<tr><td>4,799,354 A</td><td>1/1989</td><td>Midgley</td></tr>
<tr><td>4,964,844 A</td><td>10/1990</td><td>Bagnall</td></tr>
<tr><td>4,976,102 A</td><td>12/1990</td><td>Taylor</td></tr>
<tr><td>5,275,531 A</td><td>1/1994</td><td>Roberts</td></tr>
<tr><td>5,345,760 A</td><td>9/1994</td><td>Giffin, III</td></tr>
<tr><td>5,397,215 A</td><td>3/1995</td><td>Spear et al.</td></tr>
<tr><td>6,017,186 A</td><td>1/2000</td><td>Hoeger et al.</td></tr>
<tr><td>6,561,761 B1</td><td>5/2003</td><td>Decker et al.</td></tr>
<tr><td>6,634,595 B2</td><td>10/2003</td><td>Koncsek et al.</td></tr>
<tr><td>6,711,887 B2</td><td>3/2004</td><td>Orlando et al.</td></tr>
<tr><td>7,784,732 B2</td><td>8/2010</td><td>Owens et al.</td></tr>
<tr><td>8,869,504 B1 *</td><td>10/2014</td><td>Schwarz ................ F02K 1/09<br>60/226.1</td></tr>
<tr><td>9,387,923 B2 *</td><td>7/2016</td><td>Stretton ................ F02C 3/067</td></tr>
<tr><td>2008/0098717 A1*</td><td>5/2008</td><td>Orlando ................ F01D 1/24<br>60/226.1</td></tr>
<tr><td>2012/0207594 A1</td><td>8/2012</td><td>Chanez et al.</td></tr>
<tr><td>2012/0251306 A1</td><td>10/2012</td><td>Reinhardt et al.</td></tr>
<tr><td>2014/0017067 A1*</td><td>1/2014</td><td>Stretton ................ F02C 3/067<br>415/116</td></tr>
<tr><td>2014/0255188 A1</td><td>9/2014</td><td>Fulayter et al.</td></tr>
<tr><td>2014/0363276 A1</td><td>12/2014</td><td>Vetters et al.</td></tr>
</table>

FOREIGN PATENT DOCUMENTS

<table>
<tr><td>EP</td><td>1653045 A2</td><td>5/2006</td></tr>
<tr><td>GB</td><td>2254661 A</td><td>10/1992</td></tr>
<tr><td>JP</td><td>H02-016335 A</td><td>1/1990</td></tr>
<tr><td>JP</td><td>H04-121495 U</td><td>10/1992</td></tr>
<tr><td>JP</td><td>H07-247996 A</td><td>9/1995</td></tr>
<tr><td>JP</td><td>H10-502150 A</td><td>2/1998</td></tr>
<tr><td>JP</td><td>H01-069722 A</td><td>3/1998</td></tr>
<tr><td>JP</td><td>2001-271792 A</td><td>10/2001</td></tr>
<tr><td>WO</td><td>2014/066503 A1</td><td>5/2014</td></tr>
<tr><td>WO</td><td>2014/066508 A2</td><td>5/2014</td></tr>
<tr><td>WO</td><td>2014/066515 A1</td><td>5/2014</td></tr>
</table>

OTHER PUBLICATIONS

Notification of Reasons for Refusal issued in connection with corresponding JP Application No. 2016-093539 dated May 9, 2017.
First Office Action and Search issued in connection with corresponding CN Application No. 201610308308.1 dated Jul. 3, 2017.
Unofficial English Translation of Poland Office Action issued in connection with corresponding PL Application No. P.412269 dated Oct. 6, 2016.
European Search Report and Opinion issued in connection with corresponding EP Application No. 16168517.7 dated Oct. 11, 2016.
Machine translation and Second Office Action issued in connection with corresponding CN Application No. 201610308308.1 dated Jun. 4, 2018.

\* cited by examiner

IMMERSED CORE FLOW INLET BETWEEN ROTOR BLADE AND STATOR VANE FOR AN UNDUCTED FAN GAS TURBINE

FIELD OF THE INVENTION

The technology described herein relates to an unducted thrust producing system, particularly architectures for such systems. The technology is of particular benefit when applied to "open rotor" gas turbine engines.

BACKGROUND OF THE INVENTION

Gas turbine engines employing an open rotor design architecture are known. A turbofan engine operates on the principle that a central gas turbine core drives a bypass fan, the fan being located at a radial location between a nacelle of the engine and the engine core. An open rotor engine instead operates on the principle of having the bypass fan located outside of the engine nacelle. This permits the use of larger fan blades able to act upon a larger volume of air than for a turbofan engine, and thereby improves propulsive efficiency over conventional engine designs.

Optimum performance has been found with an open rotor design having a fan provided by two contra-rotating rotor assemblies, each rotor assembly carrying an array of airfoil blades located outside the engine nacelle. As used herein, "contra-rotational relationship" means that the blades of the first and second rotor assemblies are arranged to rotate in opposing directions to each other. Typically the blades of the first and second rotor assemblies are arranged to rotate about a common axis in opposing directions, and are axially spaced apart along that axis. For example, the respective blades of the first rotor assembly and second rotor assembly may be co-axially mounted and spaced apart, with the blades of the first rotor assembly configured to rotate clockwise about the axis and the blades of the second rotor assembly configured to rotate counter-clockwise about the axis (or vice versa). In appearance, the fan blades of an open rotor engine may somewhat resemble the propeller blades of a conventional turboprop engine.

The use of contra-rotating rotor assemblies provides technical challenges in transmitting power from the power turbine to drive the blades of the respective two rotor assemblies in opposing directions.

It would be desirable to provide an open rotor propulsion system utilizing a single rotating propeller assembly analogous to a traditional bypass fan which reduces the complexity of the design, yet yields a level of propulsive efficiency comparable to contra-rotating propulsion designs with a significant weight and length reduction.

BRIEF DESCRIPTION OF THE INVENTION

Aspects and advantages of the invention will be set forth in part in the following description, or may be obvious from the description, or may be learned through practice of the invention.

An unducted thrust producing system is generally provided. In one embodiment, the unducted thrust producing system includes a rotating element having an axis of rotation about a central longitudinal axis and comprising a plurality of blades attached to a spinner; a stationary element positioned aft of the rotating element; and an inlet positioned between the rotating element and the stationary element such that the inlet passes radially inward of the stationary element. The rotating element defines an annular valley positioned between a first annular crown and a second annular crown, and the inlet defines an open area positioned aft of the second annular crown.

In one particular embodiment, the unducted thrust producing system includes a rotating element having an axis of rotation about a central longitudinal axis and comprising a plurality of blades attached to a spinner. The rotating element defines an annular valley positioned between a first annular crown and a second annular crown, with the first annual crown having a first radius $(R_1)$ measured to the central longitudinal axis. The unducted thrust producing system also includes a stationary element positioned aft of the rotating element. The stationary element comprises a housing defining an inlet lip such that an inlet is positioned between the rotating element and the stationary element to pass radially inward of the stationary element, with the inlet lip defines a forward tip having a lip radius $(R_L)$ measured from the forward tip to the central longitudinal axis. In most embodiments, the inlet lip has a degree of immersion of about 50% to 125% with respect to the first radius of the first spinner crown, where the degree of immersion is calculated according to the formula: degree of immersion=$(R_1)^2/(R_L)^2 \times 100$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
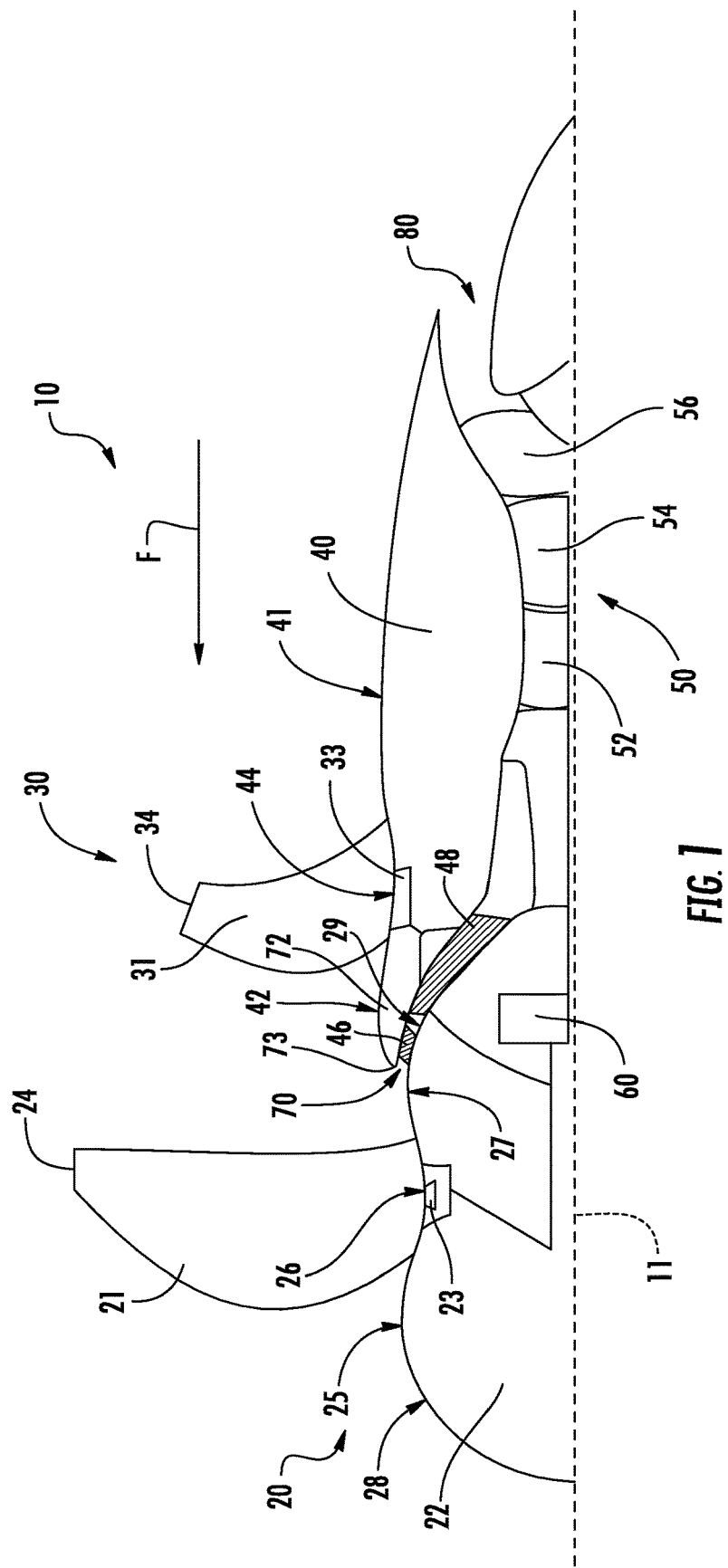
FIG. 1 shows a cross-sectional schematic illustration of an exemplary embodiment of an unducted thrust producing system.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

An inlet concept is generally provided for the core air flow of a single-rotation open rotor gas turbine engine. The inlet is located longitudinally between the rotor blades and the stator vanes, while having an aerodynamical shape with respect to its radial position such that the inlet is at least partially hidden from a flow path crown proximate to the rotor blade (i.e., the first annular crown described below with reference to FIG. 1). Such an immersed inlet provides robustness to foreign object damage ("FOD") ingestion because the momentum of the FOD objects will cause these objects to be more likely to pass over and around the inlet lip as opposed to entering the inlet. For hail ingestion, the reduced capture area of the immersed inlet results in less hail ingestion. Thus, this characteristic increases protection against FOD and bird strikes, as well as hail ingestion resistance compared to an inlet that is more exposed to oncoming flow.

Additionally, the aerodynamic shape of the inlet in terms of radial position (rotor blade radius ratios between 0 and 1; blade radius ratio is the ratio of blade tip radius to blade hub radius), and inlet lip geometric shape may vary from application to application.

FIG. 1 shows an elevational cross-sectional view of an exemplary embodiment of an unducted thrust producing system 10. As is seen from FIG. 1, the unducted thrust producing system 10 takes the form of an open rotor propulsion system and has a rotating element 20 depicted as a propeller assembly which includes an array of airfoil blades 21 around a central longitudinal axis 11 of the unducted thrust producing system 10. Blades 21 are arranged in typically equally spaced relation around the central longitudinal axis 11, and each blade 21 has a root 23 and a tip 24 and a span defined therebetween. Left- or right-handed engine configurations can be achieved by mirroring the blades 21 (and vanes 31 discussed below). As an alternative, an optional reversing gearbox (located in or behind the turbine 50 or combined or associated with power gearbox 60) permits a common gas generator and low pressure turbine to be used to rotate the fan blades either clockwise or counterclockwise, i.e., to provide either left- or right-handed configurations, as desired, such as to provide a pair of oppositely-rotating engine assemblies as may be desired for certain aircraft installations. Unducted thrust producing system 10 in the embodiment shown in FIG. 1 also includes an integral drive (power gearbox) 60 which may include a gearset for decreasing the rotational speed of the propeller assembly relative to the engine 50.

For reference purposes, FIG. 1 also depicts a Forward direction denoted with arrow F, which in turn defines the forward and aft portions of the system. As shown in FIG. 1, the rotating element 20 in a "puller" configuration is located forward of the housing 40, while the exhaust 80 is located aft of the stationary element 30. The housing 40 generally includes a gas turbine engine or other engine configured to provide sufficient energy to turn the rotating elements 20 to create thrust. The embodiment of FIG. 1 shows a gas turbine engine 50 including a compressor 52, a combustor 54, and a turbine 56 which work together to turn a shaft (not shown) extending along the central longitudinal axis 11. However, in other embodiments, a low pressure turbine 56 can be utilized with any gas generator positioned within the housing 40 to turn the shaft.

Figure 2:
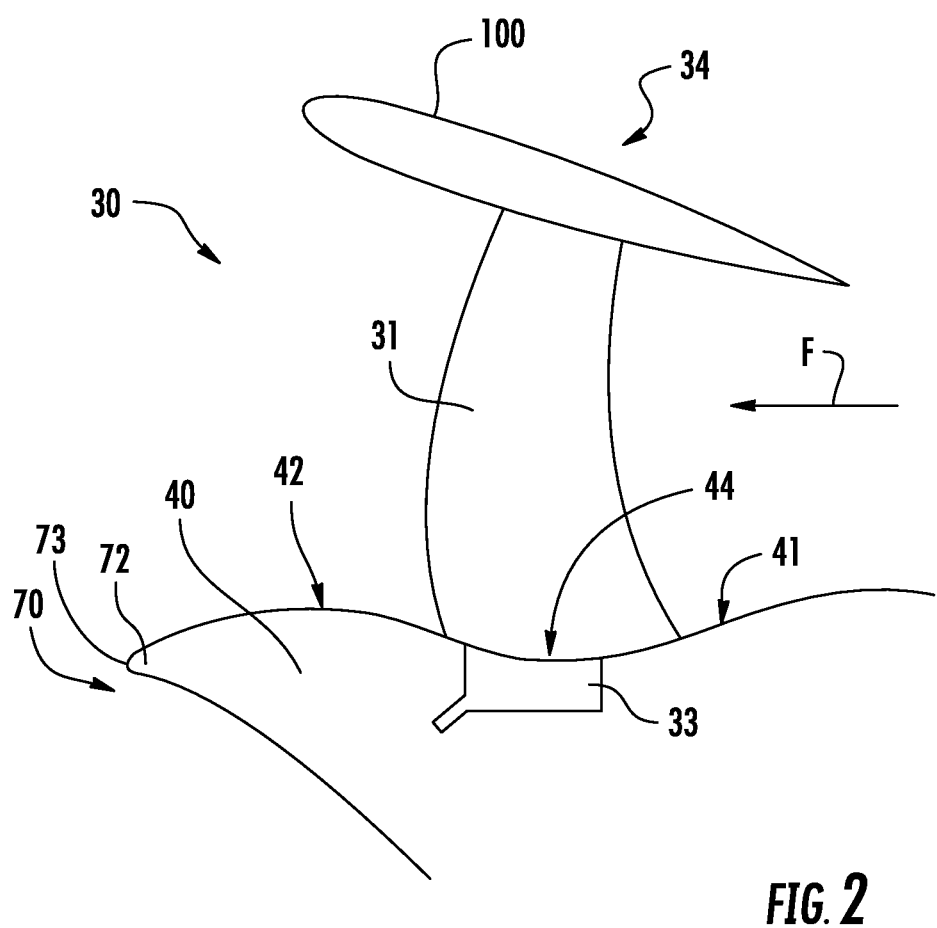
FIG. 2 shows an illustration of an alternative embodiment of an exemplary vane assembly for an unducted thrust producing system.

Unducted thrust producing system 10 also includes in the exemplary embodiment a non-rotating stationary element 30 which includes an array of vanes 31 also disposed around central axis 11, and each blade 31 has a root 33 and a tip 34 and a span defined therebetween. These vanes may be arranged such that they are not all equidistant from the rotating assembly, and may optionally include an annular shroud or duct 100 distally from axis 11 (as shown in FIG. 2) or may be unshrouded. These vanes are mounted to a stationary frame and do not rotate relative to the central axis 11, but may include a mechanism for adjusting their orientation relative to their axis and/or relative to the blades 21.

In addition to the noise reduction benefit, the shroud or duct 100 shown in FIG. 2 provides a benefit for vibratory response and structural integrity of the stationary vanes 31 by coupling them into an assembly forming an annular ring or one or more circumferential sectors, i.e., segments forming portions of an annular ring linking two or more vanes 31 such as pairs forming doublets. The shroud or duct 100 may allow the pitch of the vanes to be varied as desired.

A significant, perhaps even dominant, portion of the noise generated by the disclosed fan concept is associated with the interaction between wakes and turbulent flow generated by the upstream blade-row and its acceleration and impingement on the downstream blade-row surfaces. By introducing a partial duct acting as a shroud over the stationary vanes, the noise generated at the vane surface can be shielded to effectively create a shadow zone in the far field thereby reducing overall annoyance. As the duct is increased in axial length, the efficiency of acoustic radiation through the duct is further affected by the phenomenon of acoustic cut-off, which can be employed, as it is for conventional aircraft engines, to limit the sound radiating into the far-field. Furthermore, the introduction of the shroud allows for the opportunity to integrate acoustic treatment as it is currently done for conventional aircraft engines to attenuate sound as it reflects or otherwise interacts with the liner. By introducing acoustically treated surfaces on both the interior side of the shroud and the hub surfaces upstream and downstream of the stationary vanes, multiple reflections of acoustic waves emanating from the stationary vanes can be substantially attenuated.

In operation, the rotating blades 21 are driven by the low pressure turbine via gearbox 60 such that they rotate around the axis 11 and generate thrust to propel the unducted thrust producing system 10, and hence an aircraft to which it is associated, in the forward direction F.

It may be desirable that either or both of the sets of blades 21 and vanes 31 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 31 are sized, shaped, and configured to impart a counteracting swirl to the fluid so that in a downstream direction aft of both rows of blades the fluid has a greatly reduced degree of swirl, which translates to an increased level of induced efficiency. Vanes 31 may have a shorter span than blades 21, as shown in FIG. 1, for example, 50% of the span of blades 21, or may have longer span or the same span as blades 21 as desired. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

In the embodiment shown in FIG. 1, an annular 360 degree inlet 70 is located between the fan blade assembly 20 and the fixed or stationary vane assembly 30, and provides a path for incoming atmospheric air to enter the housing 40 radially inwardly of the stationary element 30. Such a location may be advantageous for a variety of reasons, including management of icing performance as well as protecting the inlet 70 from various objects and materials as may be encountered in operation, which is discussed in greater detail below.

Figure 3:
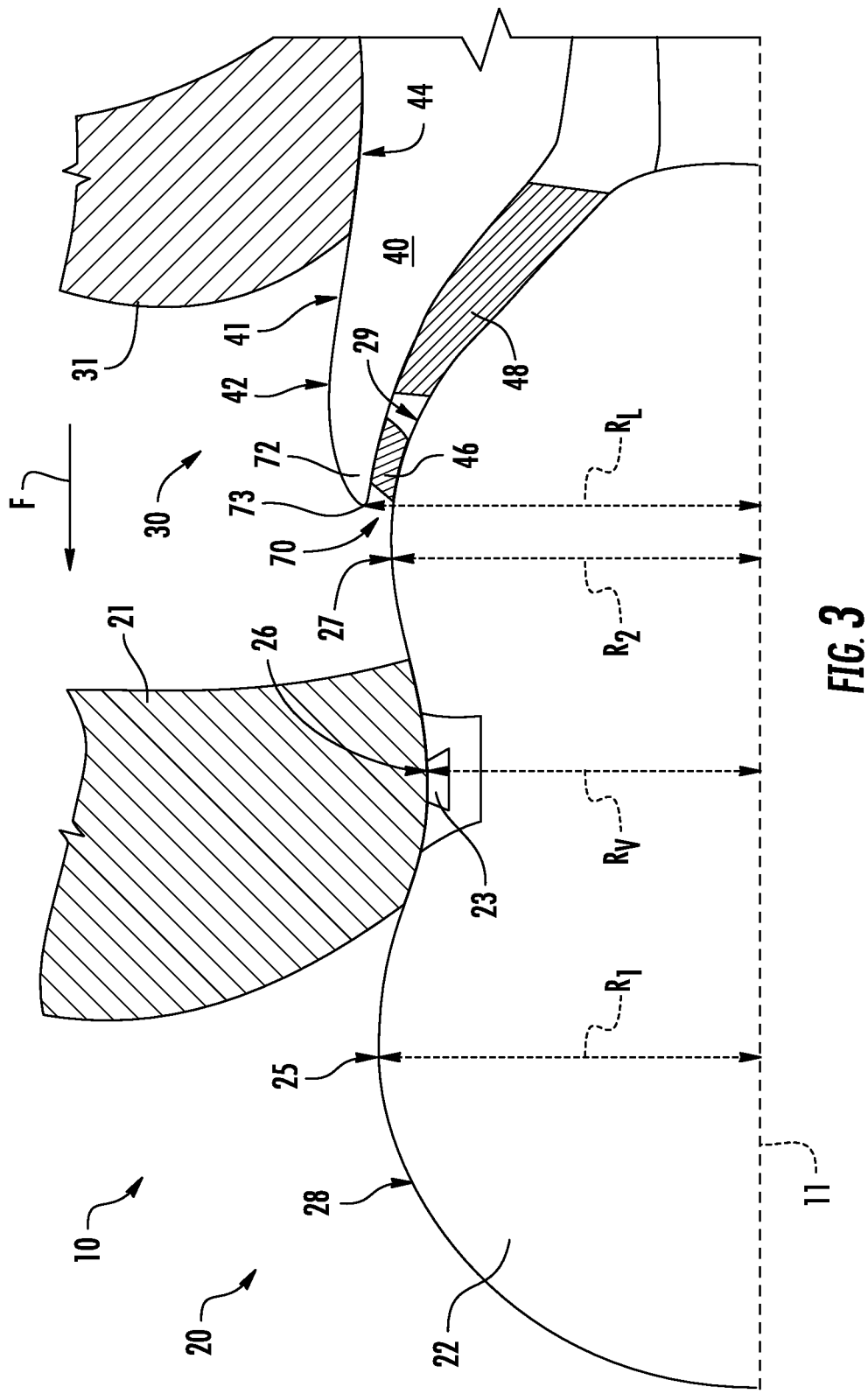
FIG. 3 shows a partial cross-sectional schematic illustration of an exemplary embodiment of the unducted thrust producing system as shown in FIG. 1.

The inlet 70 is generally defined between an inlet lip 72 on the housing 40 and an opposite, inner surface 29 that is aft of the second annular crown 27. The inner surface 29 is formed from stationary components forward of the housing 40. The inlet lip 72 defines a forward tip 73 at the point most forward of the housing 40 and the inlet lip 72. As shown in FIG. 3, the forward tip 73 of the inlet lip 72 has a lip radius $R_L$ that is measured as the distance in the lateral direction, perpendicular to the longitudinal axis 11, from the central longitudinal axis 11 to the forward tip 73.

A plurality of inlet deswirl vanes 46 are positioned within the inlet 70, and are configured to direct the airflow therethrough as desired. For example, the inlet deswirl vanes 46 may be shaped to counteract any rotational momentum within the airflow entering the inlet 70 as a result of flowing through the rotating element 20. Inlet struts 48 are also positioned within the inlet 70 to allow airflow through the inlet 70, while providing mechanical structure to the housing 40 and/or the rotating element 20.

Referring to FIGS. 1 and 3, the rotating element 20 defines a first annular crown 25 forward of the blades 21. The first annular crown 25 is defined by a point at which the distance is the greatest between the rotating element 20 forward of the blades to the centerline central longitudinal axis 11 of the unducted thrust producing system 10. That is, the first annular crown 25 is the point of maximum diameter of the rotating element 20 forward of the blades 21, and defines a first radius $R_1$ at the first annular crown 25 as shown in FIG. 3. The first radius $R_1$ is measured as the distance in the lateral direction, perpendicular to the longitudinal axis 11, from the central longitudinal axis 11 to the first annular crown 25.

Similarly, the rotating element 20 defines a second annular crown 27 aft of the blades 21. The second annular crown 27 is defined by a point at which the distance is the greatest between the spinner 22 aft of the blades to the centerline central longitudinal axis 11 of the unducted thrust producing system 10. That is, the second annular crown 27 is the point of maximum diameter of the rotating element 20 aft of the blades 21, and defines a second radius $R_2$ at the second annular crown 27. The second radius $R_2$ is measured as the distance in the lateral direction, perpendicular to the longitudinal axis 11, from the central longitudinal axis 11 to the second annular crown 27.

The rotating element 20 also defines an annular valley 26 positioned between the first annular crown 25 and the second annular crown 27. The annular valley 26 defined by a point at which the distance is the least between the rotating element 20 aft of the blades to the centerline central longitudinal axis 11 of the unducted thrust producing system 10. That is, the annular valley 26 is the point of minimum diameter of the spinner 22 between the first annular crown 25 and the second annular crown 27, and defines a valley radius $R_V$ at the annular valley 26. The valley radius $R_V$ is measured as the distance in the lateral direction, perpendicular to the longitudinal axis 11, from the central longitudinal axis 11 to the annular valley 26. As shown, the valley radius $R_V$ is less than both the first radius $R_1$ and the second radius $R_2$.

The positioning of the alternating crown-valley-crown configuration allows the rotating element 20 to define a wavy exterior surface 28 that affects the flow of air through the unducted thrust producing system 10. As used herein, the term "rotating element" includes all components within the unducted thrust producing system 10 for rotating of the blades 21, even if those components do not rotate themselves. Additionally, the term "spinner" refers to a fairing fitted over a hub of the rotating element 20. The spinner 22 can be attached to the blades 21, or may define cavities through which the blades 21 extend. The spinner 22 can define the entire surface 28 of the rotating element 20, or only the forward portion of the surface 28.

In the embodiment shown, the blades 21 are attached to the spinner 22 at the annular valley 26. Thus, the root 23 is attached to the spinner 22 within the annular valley 26. The placement of the blades 21 within the annular valley 26 produces beneficial aerodynamic streamline effects, and locally increases the annular area inside the blade row to compensate for the area reduction due to blade thickness. Such placement of the blades 21 within the annular valley 26, therefore, increases the efficiency of the rotating element 20 and the overall unducted thrust producing system 10.

The positioning of the inlet 70 is such that the inlet 70 is protected from at least a portion of the downstream airflow past the first annular crown 25 and the blades 21. Generally, the inlet 70 has a degree of immersion of about 50% to 125%. In particular embodiments, the degree of immersion is about 70% to about 100% (e.g., about 75% to about 90%). The degree of immersion is simply calculated by dividing the square of the first radius $R_1$ by the square of the lip radius $R_L$ and multiplying by 100, as shown in Formula 1:

degree of immersion=$(R_1)^2/(R_L)^2 \times 100$  Formula 1.

As such the airflow past the first annular crown 25 and the blades 21 is somewhat directed away from the central longitudinal axis 11 such that the inlet 70 is protected from at least a portion of the downstream airflow past the first annular crown 25. This configuration helps to prevent ingestion of birds, hail, or other FOD into the inlet 70 by protecting the inlet 70 from at least a portion of the airflow downstream of the blades 21 that would otherwise occur. In one particular embodiment, the inlet lip has a degree of immersion that is about 100%, such that the first radius is substantially equal to the lip radius.

The embodiment of FIGS. 1 and 3 shows that the second radius $R_2$ at the second annular crown 27 is less than the first radius $R_1$. However, in other embodiments, the second radius $R_2$ at the second annular crown 27 can be equal to or greater than the first radius $R_1$.

The housing 40 defines an exterior surface 41 aft of the inlet lip 72 and forming a housing crown 42 and a housing valley 44 sequentially from the inlet lip moving aft (i.e., opposite of forward F). In the embodiment shown, the housing crown 42 is positioned between the inlet 70 and the housing valley 44. The stationary vanes 31 is, in one particular embodiment, attached to the housing 40 at the housing valley 44. It should be understood that the housing 40 may be annular in certain embodiments, but also may have other shapes. Thus, the housing crown 42 and the housing valley 44 are not necessarily measured annularly, but are generally defined in a perpendicular axis to the central longitudinal axis 11.

FIG. 1 illustrates what may be termed a "puller" configuration where the thrust-generating rotating element 20 is located forward of the housing 40 of the engine, as opposed to a "pusher" configuration embodiment where the gas generator 40 is located forward of the rotating element 20. The exhaust 80 is located inwardly of and aft of both the rotating element 20 and the stationary element 30.

The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

As stated, a gas turbine or internal combustion engine is positioned within the housing 40. The gas turbine or internal combustion engine used as a power source may employ an inter-cooling element in the compression process. Similarly, the gas turbine engine may employ a recuperation device downstream of the power turbine.

In various embodiments, the source of power to drive the rotating element 20 may be a gas turbine engine fuelled by jet fuel or liquid natural gas, an electric motor, an internal combustion engine, or any other suitable source of torque and power and may be located in proximity to the rotating element 20 or may be remotely located with a suitably configured transmission such as a distributed power module system.

In addition to configurations suited for use with a conventional aircraft platform intended for horizontal flight, the technology described herein could also be employed for helicopter and tilt rotor applications and other lifting devices, as well as hovering devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An unducted thrust producing system, comprising:
    a rotating element having an axis of rotation about a central longitudinal axis and comprising a plurality of blades attached to a spinner, wherein the rotating element defines an annular valley positioned between a first annular crown and a second annular crown;
    a stationary element positioned aft of the rotating element, the stationary element comprising a plurality of vanes; and
    an inlet positioned between the rotating element and the stationary element such that the inlet passes radially inward of the stationary element, wherein the inlet defines an open area positioned aft of the second annular crown.

2. The unducted thrust producing system as in claim 1, wherein the plurality of blades are attached to the spinner at the annular valley.

3. The unducted thrust producing system as in claim 1, wherein the stationary element comprises a housing defining an inlet lip.

4. The unducted thrust producing system as in claim 3, wherein the first annular crown has a first radius ($R_1$) measured to the central longitudinal axis, and wherein the inlet lip defines a forward tip having a lip radius ($R_L$) measured from the forward tip to the central longitudinal axis;
    wherein the inlet lip has a degree of immersion of about 50% to 125%, where the degree of immersion is calculated according to the formula:

$$\text{degree of immersion} = (R_1)^2/(R_L)^2 \times 100.$$

5. The unducted thrust producing system as in claim 4, wherein the inlet lip has a degree of immersion that is about 70% to about 100%.

6. The unducted thrust producing system as in claim 4, wherein the inlet lip has a degree of immersion that is about 75% to about 90%.

7. The unducted thrust producing system as in claim 4, wherein the inlet lip has a degree of immersion that is about 100%, such that the first radius is substantially equal to the lip radius.

8. The unducted thrust producing system as in claim 3, wherein the inlet is defined between the inlet lip of the housing and an opposite inner surface.

9. The unducted thrust producing system as in claim 8, further comprising: a plurality of inlet deswirl vanes within the inlet.

10. The unducted thrust producing system as in claim 8, further comprising: a plurality of inlet struts within the inlet.

11. The unducted thrust producing system as in claim 8, wherein the housing defines an exterior surface aft of the inlet lip, and wherein the exterior surface of the housing defines a housing crown and a housing valley sequentially from the inlet lip.

12. The unducted thrust producing system as in claim 11, wherein at least one vane is attached to the housing at the housing valley.

13. The unducted thrust producing system as in claim 11, further comprising:
    a gas turbine engine within the housing, wherein an airstream passing through the inlet is directed to the gas turbine engine.

14. The unducted thrust producing system as in claim 11, further comprising:
    a gas generator within the housing; and
    a low-pressure turbine, wherein an airstream passing through the inlet is directed to the gas generator.

15. The unducted thrust producing system as in claim 1, wherein the first annular crown has a first radius measured to the central longitudinal axis, and wherein the second annular crown has a second radius measured to the central longitudinal axis; and further wherein the first radius is greater than the second radius.

16. An unducted thrust producing system, comprising:
    a rotating element having an axis of rotation about a central longitudinal axis and comprising a plurality of blades attached to a spinner, wherein the rotating element defines an annular valley positioned between a first annular crown and a second annular crown, the first annual crown having a first radius ($R_1$) measured to the central longitudinal axis;

a stationary element positioned aft of the rotating element, wherein the stationary element comprises a plurality of vanes and a housing defining an inlet lip such that an inlet is positioned between the rotating element and the stationary element to pass radially inward of the stationary element, wherein the inlet lip defines a forward tip having a lip radius ($R_L$) measured from the forward tip to the central longitudinal axis;

wherein the inlet lip has a degree of immersion of about 50% to 125% with respect to the first radius of the first spinner crown, where the degree of immersion is calculated according to the formula:

$$\text{degree of immersion} = (R_1)^2/(R_L)^2 \times 100.$$

17. The unducted thrust producing system as in claim 16, wherein the inlet lip has a degree of immersion that is about 70% to about 100%.

18. The unducted thrust producing system as in claim 16, wherein the inlet lip has a degree of immersion that is about 75% to about 90%.

19. The unducted thrust producing system as in claim 16, wherein the plurality of blades are attached to the spinner at the annular valley.

* * * * *